(12) United States Patent
Davies

(10) Patent No.: US 8,103,373 B2
(45) Date of Patent: Jan. 24, 2012

(54) CONTROL SYSTEM

(76) Inventor: Kevin S. Davies, Duncraig (AU)

( * ) Notice: Subject to any disclaimer, the term of this patent is extended or adjusted under 35 U.S.C. 154(b) by 449 days.

(21) Appl. No.: 10/596,377

(22) PCT Filed: Dec. 10, 2004

(86) PCT No.: PCT/AU2004/001739
§ 371 (c)(1),
(2), (4) Date: Sep. 4, 2007

(87) PCT Pub. No.: WO2005/056207
PCT Pub. Date: Jun. 23, 2005

(65) Prior Publication Data
US 2008/0065256 A1 Mar. 13, 2008

(30) Foreign Application Priority Data

| Dec. 11, 2003 | (AU) | .................................. | 2003906838 |
| Dec. 23, 2003 | (AU) | .................................. | 2003907100 |
| May 24, 2004 | (AU) | .................................. | 2004902730 |
| Jun. 11, 2004 | (AU) | .................................. | 2004903144 |
| Aug. 10, 2004 | (AU) | .................................. | 2004904464 |

(51) Int. Cl.
*G06F 19/00* (2011.01)
(52) U.S. Cl. ......... 700/165; 700/178; 72/20.1; 250/221; 100/348

(58) Field of Classification Search ............... 72/1, 14.3, 72/20.1, 37; 100/348; 250/221; 700/165, 700/166, 178, 190, 192
See application file for complete search history.

(56) References Cited

U.S. PATENT DOCUMENTS

| 4,430,879 A | 2/1984 | Rolland |
| 4,660,703 A | 4/1987 | Filcich et al. |
| 6,389,860 B1 | 5/2002 | Stalzer |
| 6,644,080 B2 | 11/2003 | Lindstrom |

OTHER PUBLICATIONS

International Search Report for PCT/AU2004/001739.

*Primary Examiner* — Albert Decady
*Assistant Examiner* — Douglas Lee
(74) *Attorney, Agent, or Firm* — Bachman & LaPointe, P.C.

(57) ABSTRACT

A control system for use with a machine having a moving tool arranged to move through a known path of movement. The control system includes a means for detecting the location of objects in or adjacent the path of the tool (12) and a processing and control means arranged to determine the distance between the objects in or adjacent the path of the tool and a leading edge (22) of the tool (12). The control system includes at least one mode of operation in which the processing and control means controls movement of the tool (12) such that the distance between the objects in or adjacent the path of the tool and the leading edge (22) of the tool (12) is maintained within minimum and maximum values.

59 Claims, 10 Drawing Sheets

CONTROL SYSTEM

BACKGROUND OF THE INVENTION

The present invention relates to a control system, in particular a system for use with machinery having moving parts, such as press brakes, to detect objects in the path of the moving part and control the movement of the part accordingly.

A typical break press has a long anvil with a V-shaped groove along the top and a blade with a forward edge that fits into the groove of the anvil. To bend a piece of sheet metal, most machines drive a back-gauge into a position to align the material. The material is placed onto the anvil and may be slotted into guides provided by back-gauge clamps. The operator then activates the press, driving the blade down so that it comes into contact with, and then bends the sheet metal that has been placed over the groove of the anvil.

The controller (the device that controls movement of the blade) may be activated by mechanical means or by a presence sensing device. Mechanical means may be, for example, footswitches, double handed approach switches or the like. Presence sensing devices such as light curtains are placed in front of the blade and allow the blade to be activated by the operator removing hands from the sensing zone.

After a bend, the material can be difficult to remove from the anvil if the blade has not been set to retract far enough away from the work. For this reason, a press brake blade is often configured to retract to a height where the bent material can easily be removed, and a new piece placed onto the anvil. Opening the blade to a set height in this fashion reduces productivity and increases the workload of the operator as the operator must wait for the blade to first retract and then approach the next piece of material that is placed onto the anvil in response to activation of an approach switch.

This relatively large opening increases danger to the operator as there is a gap into which the operator may insert fingers or hands. Techniques such as having a programmable blade opening height for each stage of the bending process and/or a fast approach speed to the material have been used to improve productivity.

A number of systems have been devised to detect the presence of hands or fingers under the blade and to therefore avoid the possibility of crush injuries or entrapment.

For example, a system using laser beams projected along the underside of a blade may be used for this purpose and to improve productivity by permitting the blade to travel straight through the mute point in relative safety. An improved method has also been described in the applicant's own earlier patent application, published under International Publication Number WO03/104711. This invention discloses a device that is suitable for safety in that it may slow and stop the blade in response to a detected unsafe action. Other than stopping or slowing movement, it does not control movement of the blade in response to images received nor does it permit blade movement again until the operator re-activates the approach switch. Also, laser systems projected along the underside of the blade are known to suffer from vibration of the laser beam due to the length of the blade and are known to require periodic manual re-alignment.

To improve safety, the blade may be stopped a preset distance (often called the mute or pinch point) above the material and the approach switch required to be released and re-asserted again before the bending action restarts. This action reduces productivity as extra time is spent, during the process of aligning the material, activating the approach switch, waiting for the blade to approach the material and the releasing and reasserting of the approach switch at the mute point. Alternatively, as described in WO03/104711 and other patents, the zone in front of the blade is examined and the blade conditionally permitted to travel through the mute point without stopping, however, this method only operates if the area in front of the blade is shown to be safe, also operator control and perceived safety is reduced as the blade travels a relatively large distance before the blade comes into contact with the material. Also in this situation, the blade is not stopped just above the material, so the operator is not able to use the blade to ensure the material is positioned correctly.

Some modern press brake machines have associated computer systems that permit the material bend operations to be demonstrated graphically on a computer screen. A computer may also open the blade to an appropriate height for the bend that is being performed. However, if the material is oriented incorrectly when placed onto the anvil then either the wrong bend may be performed, or the operator may need to stop the machine and re-orient the material.

A further problem with existing press brakes arises when bending a box. During this operation, an operator may bend the two sides of the box then rotate the work piece 90 degrees to bend the back of the box. If the material isn't aligned correctly or if the material is not sitting flat on the anvil, then the left or right edge of the blade could be damaged, or the material crumpled due to the blade coming into contact with one of the up-stands. This would be likely to occur if the material is not aligned correctly when the approach switch is activated.

In order to avoid this problem, it is known to use a laser system to make the blade stop just above the up-stands or configure such a stop into the machine, thereby permitting the operator to ensure the material is positioned correctly for the blade to pass between the sides without coming into contact with them. Alternatively, the operator may lower the opening height of the blade to less than the height of the material upstands, potentially resulting in increased difficulty inserting and removing the bent material. Such systems however will result in decreased productivity due to the additional time added to the process.

Multiple devices may be required to achieve the various tasks mentioned above and this can result in increase system complexity, with the system having more parts to be damaged, calibrated connected to the machine, aligned, to fail during operation or to get in the way of the material, blade, anvil or the bending operation.

The present invention attempts to overcome at least in part some of the aforementioned problems.

SUMMARY OF THE INVENTION

In accordance with one aspect of the present invention there is provided a control system for use with a machine having a tool arranged to move through a known path of movement, the control system characterised by comprising:

a means for detecting the location of objects in or adjacent the path of the tool; and a processing and control means arranged to determine the distance between the objects in or adjacent the path of the tool and a leading edge of the tool;

wherein the control system includes a first mode of operation in which the processing and control means controls movement of the tool such that the distance between the objects in or adjacent the path of the tool and the leading edge of the tool is maintained within minimum and maximum values.

BRIEF DESCRIPTION OF THE DRAWINGS

The present invention will now be described, by way of example, with reference to the accompanying drawings, in which:

FIG. 5b is a side view of the light emitting means adjustment arrangement of FIG. 5a;

DESCRIPTION OF THE INVENTION

Referring to the Figures, there is shown a control system for use with machinery having moving parts to detect the presence of obstructions in the path of the moving part. In the embodiment shown, the control system is employed on a press brake comprising a moving tool 12 arranged to strike work placed on an anvil 14.

Figure 1:
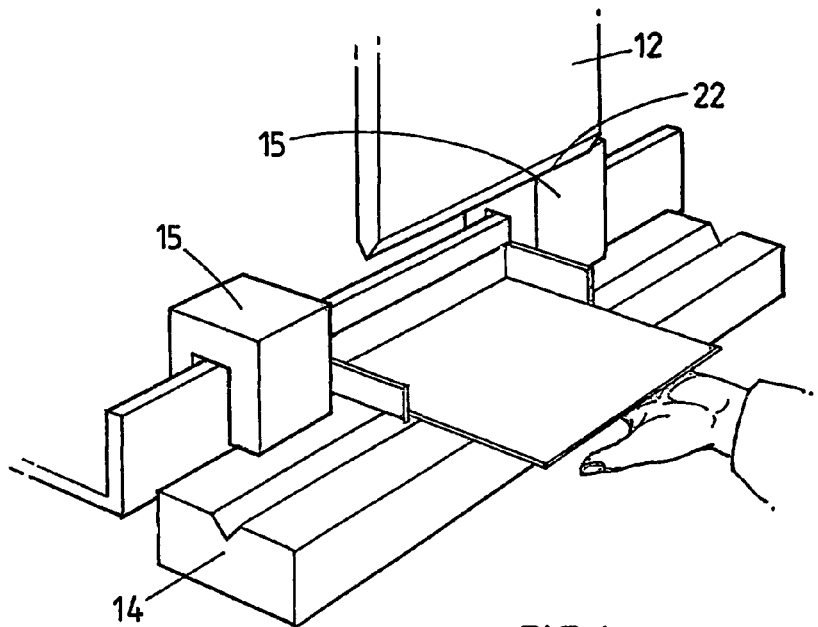
FIG. 1 is a view of a typical press brake to which the control system of the present invention may be applied, showing material side clamps that may be used with the present invention.
Figure 2:
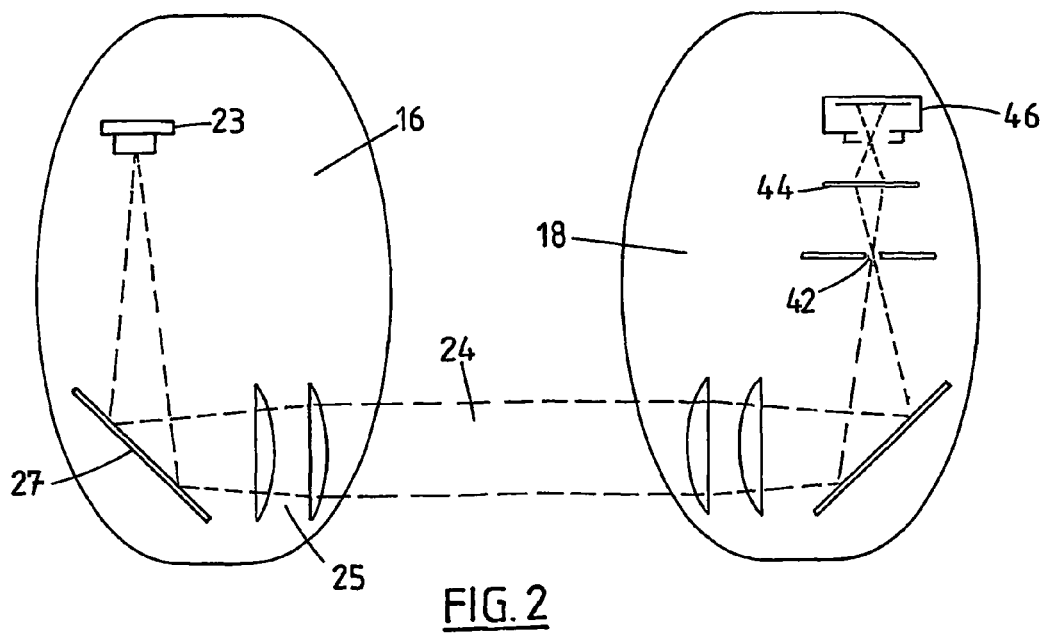
FIG. 2 shows a light emitting means and a light receiving means of a control system in accordance with the present invention.
Figure 3:
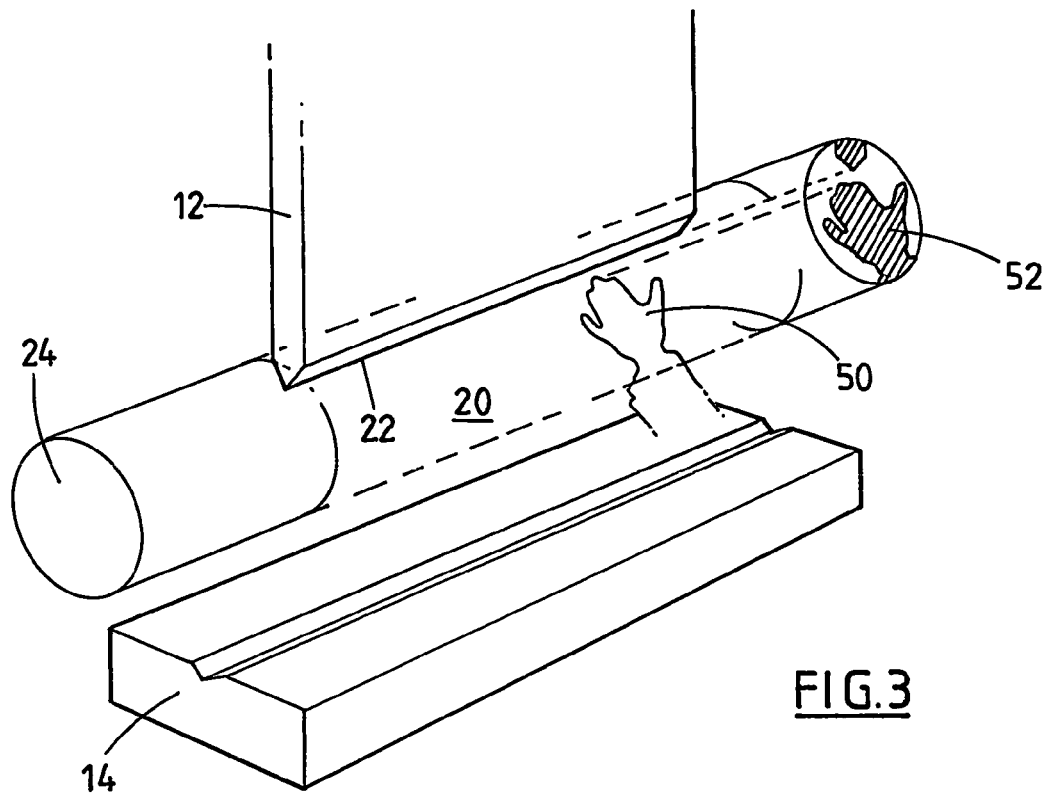
FIG. 3 is a perspective view of a press brake with a region around the tool edge illuminated in accordance with the present invention.
Figure 4:
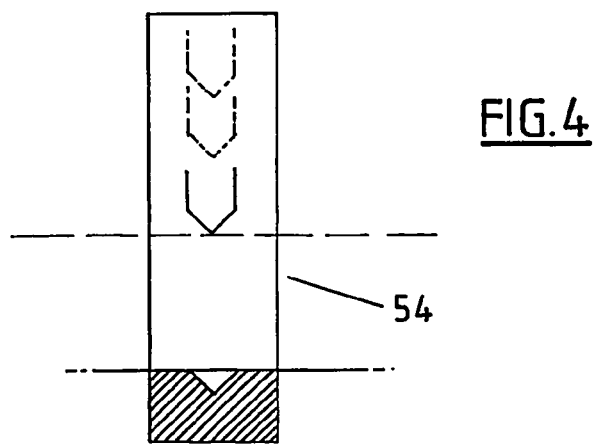
FIG. 4 is a view of a shadow map created by the control system of the present invention.

FIGS. 1 to 3 show an object sensing device of a type based on the system described in International Patent application published under International Publication Number WO03/104711, on which the present invention may be implemented. The control system requires a means for detecting the extents of objects in or adjacent the path of the tool 12 and a processing and control means arranged to determine the distance between the objects and a leading edge 22 of the tool 12.

The control system 10 shown includes a light emitting means 16 and a light receiving means 18. The light emitting means 16 is arranged to illuminate a region 20 around a portion of the path of movement of the tool 12 in order to detect obstructions in said region 20.

FIG. 2 shows an arrangement in which a laser diode 23, mirror 27 and lens arrangement are used to create a large area parallel light beam 24. The light receiving means 18 includes a pinhole aperture 42, a projection screen 44 and camera that includes a charge coupled device (CCD) 46.

As shown in FIG. 3, the light emitting means 16 is mounted at one end of the tool 12 of the press brake such that the parallel light beam 24 illuminates a region 20 around the path of movement of the tool 12 which includes the forward edge 22 of the tool 12. The light receiving means 18 is mounted at the opposite end of the tool 12 to receive the light beam 24. If an obstruction 50, such as the hand of the operator, enters the region 20, a corresponding shadow 52 will be cast on the CCD 46.

Using a single wavelength laser diode, speckle with a high contrast is observed on the projection screen, this speckle results in an undesirable decrease in sensing resolution for the control system. It is noted that the wavelength of a laser diode varies with output power and temperature and that speckle patterns vary with the wavelength of the laser diode. In accordance with producing an image with a suitable resolution, the current through the laser diode is modulated so the wavelength is varied, in this case, by about 0.3%. The current is varied at a high frequency so many wavelengths and hence speckle patterns are received during the aperture time of the CCD camera. The current through the laser diode and hence the wavelength is varied more slowly at lower power levels than higher power levels ensuring the CCD camera receives similar total energy at many different wavelengths and hence similar total energy of many different speckle patterns during the aperture time. Alternatively, or also the projection screen may be made from a fibrous material such as paper so the speckle is further reduced.

A processing and control means (not shown) is connected such that it receives information from the light receiving means 18 and controls operation of the press brake. The processing and control means may be in the form of a software program residing on a computer or a DSP (digital signal processor) that receives input from the output of the light receiving means 18, is configured to receive inputs from other sources such as the machine or the operator and is configured with outputs to control the machine.

As described in the above mentioned International Patent application, the processing and control means captures the images received by the CCD 46 and stores the images as a shadow map 54. Alternatively, these shadow maps may be preloaded into the control system from an external source. The source may be an external database containing this information or a system capable of generating the information from information on known bend operations. The processing means will store a plurality of known shadow maps 54 (into a location referred to as a 'shadow stack'). Further, each type of bend performed by an operator may be assigned a number (to be referred to as the 'bend number') and each shadow stack stored in a portion of the shadow map corresponding to the bend number. The known shadow maps 54 are shadow maps 54 showing static objects and the material to be bent.

Figure 5A:
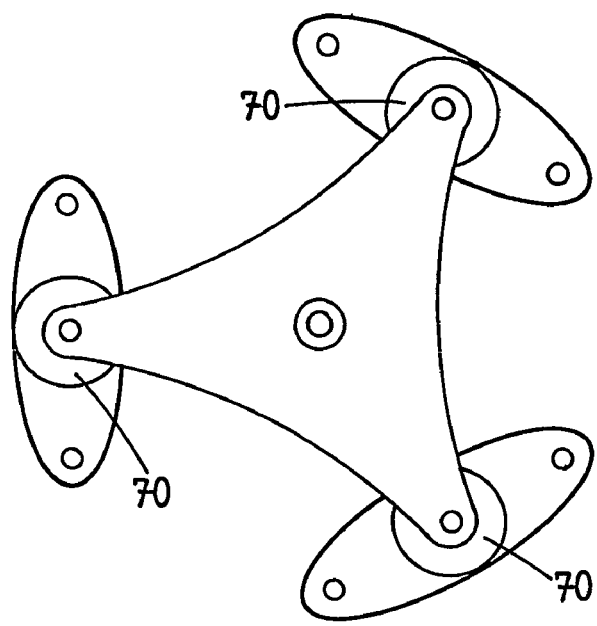
FIG. 5a is a top view of a light emitting means adjustment arrangement for use with the control system of the present invention.
Figure 5B:
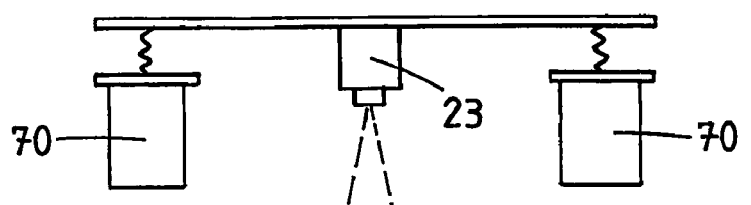
Figure 5B:
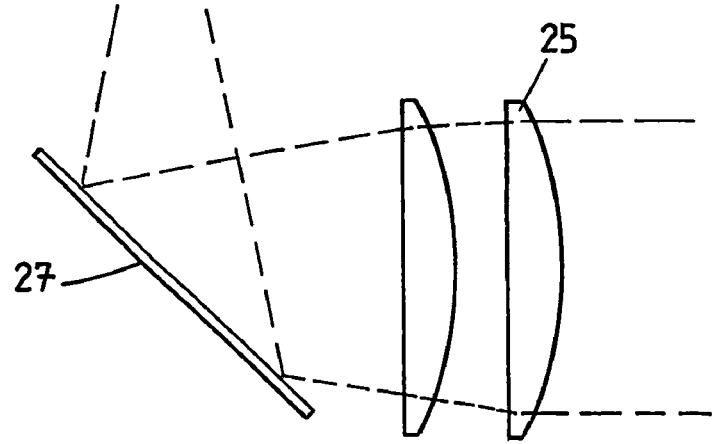

In a preferred embodiment, the control system includes a means to automatically adjust the direction of the emitted beam, as shown in FIGS. 5a and 5b. The direction is altered by movement of three linear or voice coil actuators 70. Moving the laser diode 23 towards or away from the mirror 27 alters the optical path length to the lens arrangement 25. Accordingly by moving all three linear actuators 70 together, the laser beam is diverged or converged. Moving the linear actuators 70 independently, alters the direction of the beam. Preferably the movement of the linear actuators 70 is controlled by the processing and control means based on the image received by the light receiving means 18, thus allowing automatic alignment.

Vibration of the laser beam causing problems are described in WO03/104711 and WO04/079255 is corrected for by digitally altering images or detection areas accordingly. The preferred embodiment has a means for adjusting the height of the transmitter and receiver relative to the blade. This mechanism results in some loss of rigidity and potentially adds to vibration of the transmitted laser beam. To overcome this, the preferred embodiment uses a balanced transmitter in which the centre of gravity of the transmitter is aligned vertically with the point where loss of rigidity in the adjusting mechanism occurs. The balancing point may be adjusted using a vernier adjusting counter weight. To further reduce vibration effects, low acceleration and deceleration of the blade may be used and the images may also be ignored during and for a short period after harsh stopping of the blade. Residual misalignment or distortion of the received images caused by vibration or distortion of the blade is either ignored by expanding shadowed areas of the images or compensated for by using the shadow masks or other means to determine the amount of misalignment.

For longer press brakes, wind can cause the image to distort close to the blade so in this event, either the area close to the blade may need to remain unused, or the press brake may need to be positioned where disruptive air flow is not experienced.

The control system of the present invention includes a number of modes of operation. The mode of operation in which the control system exists at any point in time will be determined by the images received by the light receiving means and input from the operator. The control system of the present invention includes at least one mode of operation in which the processing and control means uses the image received by the light receiving means 18 to determine the distance between the leading edge 22 of the tool 12 and any obstructions in the path of movement of the tool 12 such that the distance between the leading edge 22 of the tool 12 and the nearest point on the obstruction is maintained between predefined minimum and maximum values. That is, the tool 12 is arranged to follow movement of obstructions. This allows the operator to move the work without interference from the tool 12 and without the need to fully retract the tool 12. These minimum and maximum values may be preset by the operator, predefined or dynamically altered in response to the extents of objects detected in the field of view.

Figure 6:
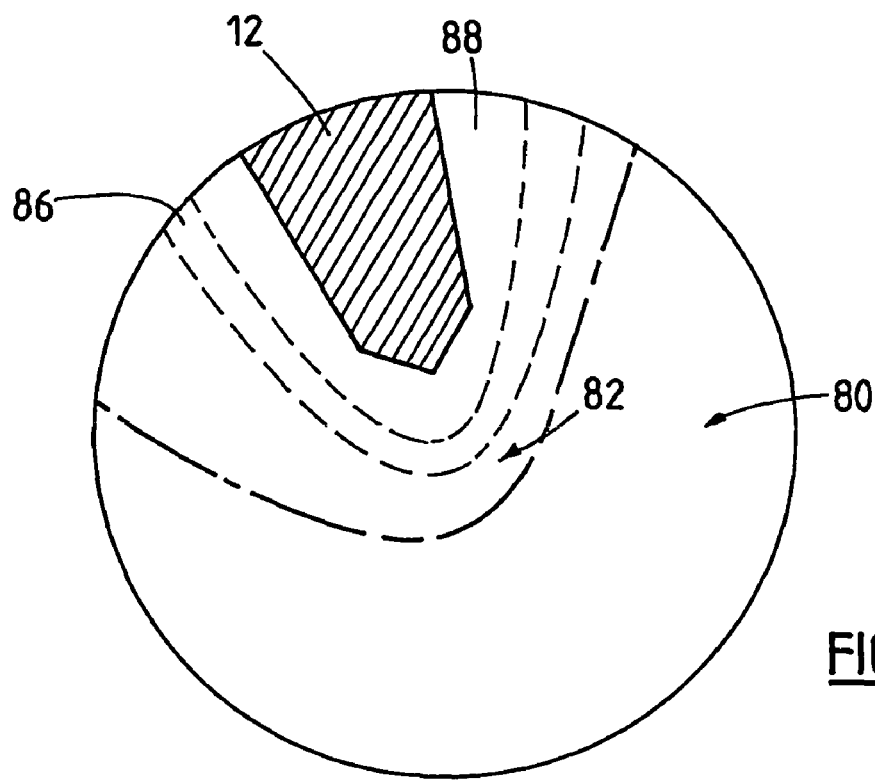
FIG. 6 shows an arrangement of various zones around the leading edge of the tool of the control system used to control movement of the tool.

FIG. 6 shows an arrangement for zones around the tool 12 defined in the processing and control means for controlling movement of the tool 12 in the mode of operation described above. In the arrangement of FIG. 6, there is included a first approach zone 82, a second approach zone 80, a stop zone 86 and a retract zone 88. In use, the nearest obstruction to the tool is detected by the processing and control means is in the second approach zone 80 or no obstruction is detected, the tool 12 is moved toward the anvil 14. If the nearest obstruction is detected in the first approach zone 82, the tool 12 is moved toward the anvil 14 at a speed slower than movement caused by obstructions in the second approach zone 80. If the nearest obstruction is detected in the retract zone 88, the tool 12 is moved away from the anvil and if the nearest obstruction is detected in the stop zone 86, movement of the tool 12 is halted. While this arrangement uses four zones of the shape shown, it will be appreciated that other arrangements of zone shapes and numbers would be possible. Also, the definitions of the zones used may be altered, depending on the bend being performed.

The control system would also generally have at least three other modes of operation, a second mode of operation being one in which the blade approaches the material when the material is placed onto the anvil, a third mode being the bending of the work and a fourth being unconditional retraction of the tool 12.

The change of mode of operation of the control system is controlled by images received or one or more operator or other input means. The input means may comprise an approach switch and a retract switch. The retract switch acts to move the tool 12 away from the anvil 14 when depressed. The movement of the tool 12 away from the anvil 14 ceases when the retract switch is released or a predefined height (or distance from the material or anvil) is reached.

Activation of the approach switch acts to either cause the tool 12 to follow the work as described previously at a distance allowing the operator to adjust the material, or to approach the work prior to a bend, or to bend the work, depending on factors including whether the image received by the light receiving means is part of a known shadow map 54.

Figure 7:
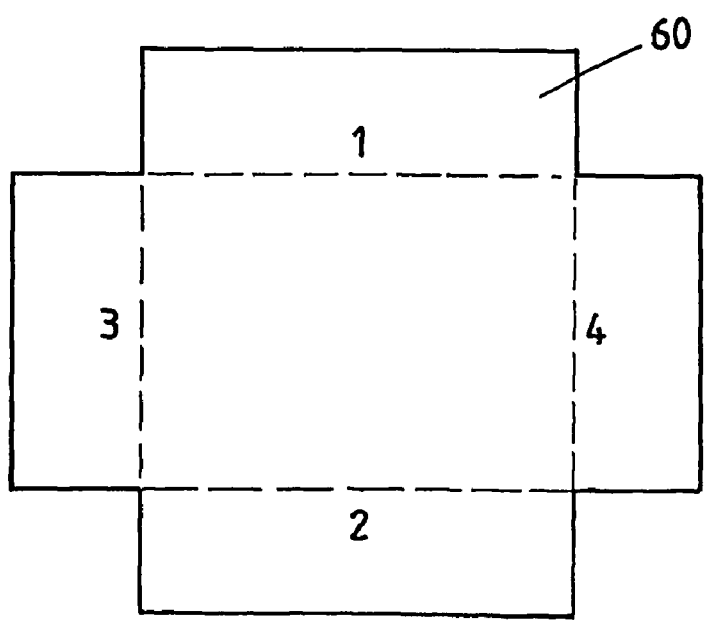
FIG. 7 is top view of a sheet of material to be bent into a box.

The use of the control system will now be described with reference to the bending of a box from the sheet of material 60 shown in FIG. 7. The flow diagram of FIG. 12 sets out one embodiment of the logic which may be used by the processing and control means during the steps of bending the box.

Figure 8A:
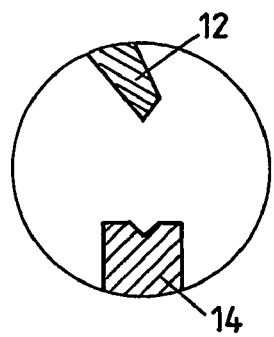
FIGS. 8a to 8c are views of the shadows cast on the light receiving means during the steps of the first two bends of the sheet of material of FIG. 7.
Figure 12:
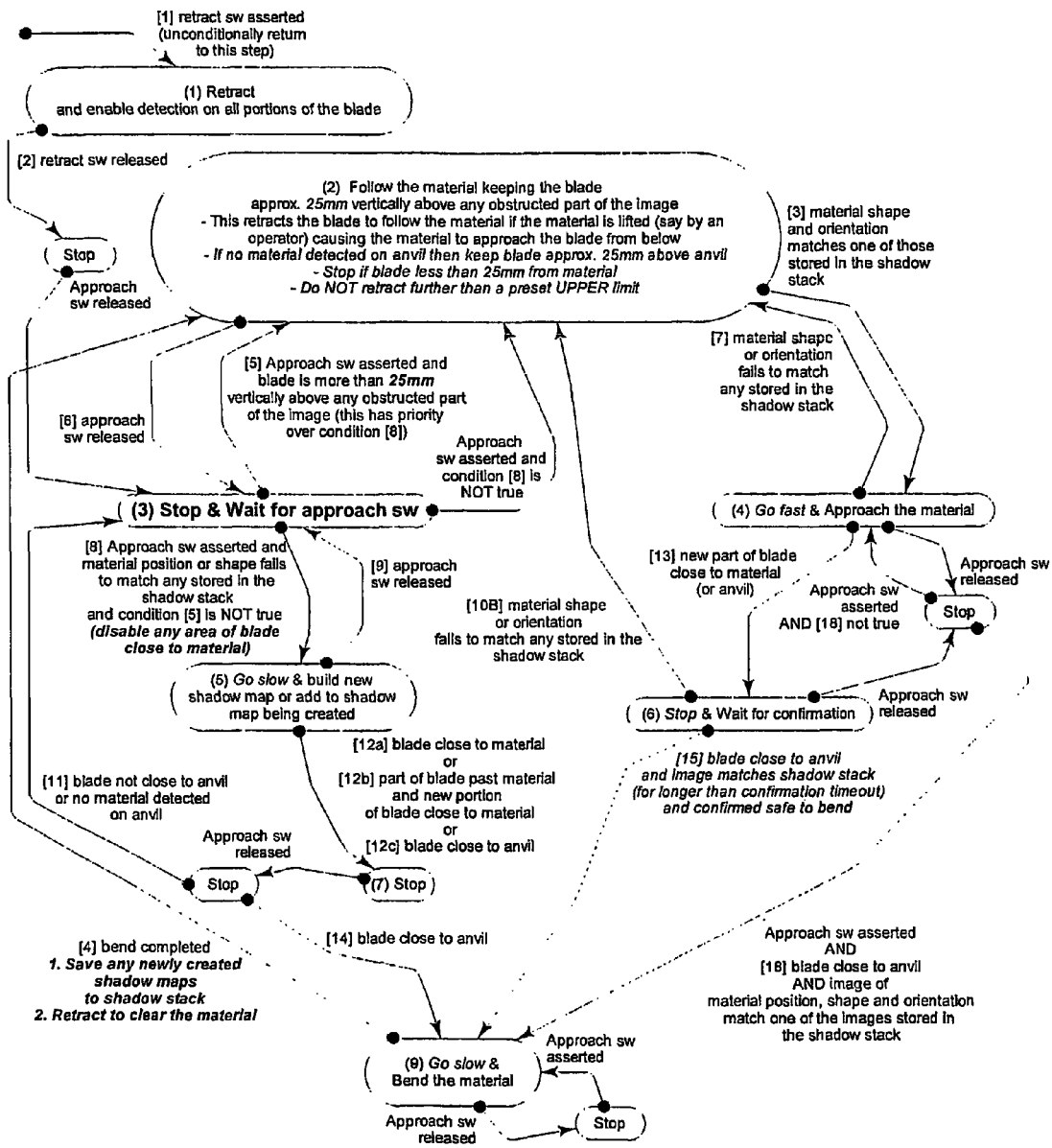
FIG. 12 is a flow diagram of the steps of movement of the tool of the press brake of a control system in accordance with the present invention.

In use, referring to FIG. 12, the tool 12 is retracted by the operator (state 1 in FIG. 12) using the retract switch leaving ample room for the material to be placed on the anvil 14. On release of the retract switch, the system moves to state 3. FIG. 8a shows the image of the tool 12 and anvil 14 with no material present. The operator then places the sheet of material 60 on the anvil 14 and activates the approach switch. The processing and control means enters state 2 via condition 5 as the blade is more than 25 mm from the material and controls movement of the tool 12 such that images that do not match any of the known safe shadow maps are kept a preset distance (approx 25 mm in this case) from the tool (state 2 in the flow diagram). If no images are preloaded into the processing and control means, then as there are initially no known maps, the tool 12 is moved until the anvil 14 and sheet of material 60 are approximately 25 mm from the tool 12. While the approach switch is kept depressed, the processing and control means will maintain this state, thus following the movement of the work.

Figure 8B:
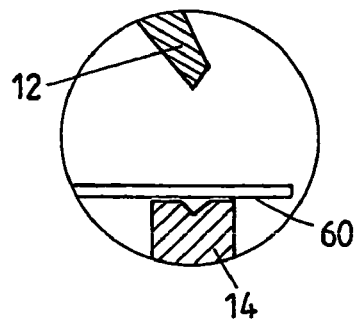
Figure 8C:
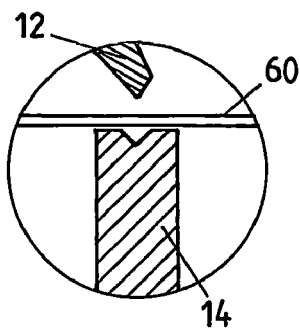

The tool 12 stops at the condition described above (state 2 in the flow diagram and as shown in FIG. 8b) and the operator must release and then reassert the approach switch to continue, if deemed safe. The processing and control means then registers that the approach switch has been released (thus moving to state 3) and reasserted in a condition in which the tool is not more than the preset distance from the obstruction. As the image at this point is not a known safe shadow map, the tool 12 moves downwardly until the tool 12 comes to a predefined distance from the work or anvil, building a new shadow map (thus moving through state 5 to state 7). The predefined distance is a distance set to be sufficiently close to the work to continue the bend, for example 3 mm. Preferably this movement is at a slow speed unless safety can be assured, in which case a fast approach may be permitted. The image received by the light receiving means 18 is now that shown in FIG. 8c.

From this state, release and reassertion of the approach switch causes the tool 12 to bend the material (moving from state 7 to the next 'Stop' condition and on to state 9).

After the bend is complete, the newly created shadow map is saved to the shadow stack, the control system is returned to state 2 of FIG. 12 and follows the material placed on the anvil by the operator.

In bending the second side of the box, the upstand will be sufficiently far from the illuminated region to not be detected. If bend numbers are not used then from state 2, the processing and control means determines the image is a known shadow map (built and stored when bending the first side) and therefore moves to state 4, thus moving at a faster speed until the tool is close to the anvil (state 6 via condition 13). Also, provided safety can and clearance to move the material can be assured (in this case it can as there is no obstruction near the blade) the progression of the blade towards the material may be in proportion to how closely the images match the known image in the shadow stack (this permits increased productivity as the blade is moved towards the material before the material is fully aligned) The bend can then be performed by release and reassertion of the approach switch. Alternatively, after a predetermined time period, and provided safety can be assured, the bend can automatically commence (dashed line of condition 15). If bend numbers are used, then, unless the same bend number is used as for the first side, the second side must be configured into an appropriate portion of the shadow stack corresponding to the second bend, as described before.

Figure 9A:
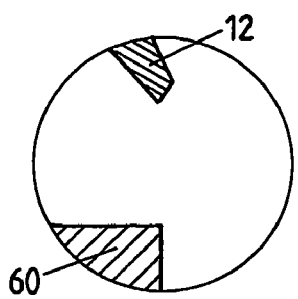
FIG. 9a to 9c are views of the shadows cast on the light receiving means during the steps of the third and fourth bends of the sheet of material of FIG. 7.
Figure 9B:
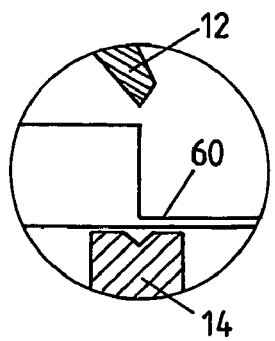
Figure 9C:
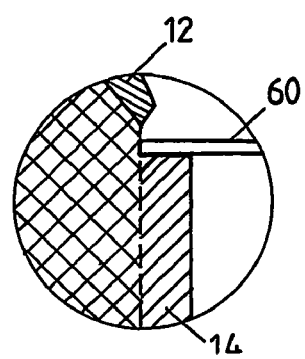

To further describe the operation, we will assume that the operator retracts the tool 12 to well above the material. If the tool 12 is retracted to be more than 25 mm from the material then, as described previously, in state 2, the tool 12 is maintained at a preset distance from unknown shadows. Therefore, when bending the third side, unless images are preloaded, the upstand of the box is not recognised and therefore the top of the upstand is kept at the preset distance from the tool 12 (as shown in FIG. 9a) however if the tool is retracted to a lower height then the system progress to state 5 when the approach switch is activated, removing the need to enter state 2 and follow the material. When the operator is ready to proceed, the approach switch is released and reasserted as above and the tool descends slowly (fast if safety can be assured) to the predefined distance from the work or the anvil 14 (to state 7 as described previously). In this case, the tool 12 descends until it is at the predefined distance from the upstand (as shown in FIG. 9b). On release of the approach switch in this case, the system moves from state 7 to state 3 via condition 11 as the tool 12 is not close to the anvil 14. On reassertion of the approach switch, the tool 12 descends slowly and the portion of the image which would obstruct the tool 12 is disabled as shown in FIG. 9c (via state 5 to state 7 again). During this process, a shadow map is created and later saved as a known shadow map.

As the portion of the image obstructing the tool 12 is disabled, the tool 12 will descend until the tool 12 is the predefined distance from the work or anvil 14. In this case, the tool 12 descends until it is the predefined distance from the flat portion of the work on the anvil 14 as shown in FIG. 9c as no other obstructions exist. The bend can then be completed and as described earlier and the known shadow map saved to the shadow stack.

After completing the third bend, the tool 12 retracts and the control system returns to state 2 in which the material is followed for as long as the approach switch remains asserted. The operator turns the material around. The tool 12 will move until it is the predefined distance from the top of the unknown image, which in this case will be the upstands created by the first and second bends.

By releasing and reasserting the approach switch twice, the control system will move through states 4, 6, 4 and 6 again to bend the material. Alternatively, if the operator places the material squarely onto the anvil but keeps the upstands in front of the tool, then this fulfils condition 3, as both the shape and orientation match an image stored in the shadow stack. Also safety can be assured as a clear path is observed all around the tool so the control system drives the tool down at high speed to just above the flat part of the material, by releasing and reasserting the approach switch once, the control system moves through states 4 and 6 to bend the material. Alternatively, if lateral material position and safety can be confirmed then condition 13 is modified and does not need to progress to state 6 when a new part of the blade comes close to the material but the blade may simply be slowed. Also, if the approach switch has been released before the tool has retracted to be higher than the upstand or the tool opening was set lower than the upstand, then the approach switch would only need releasing and reasserting once. However, as described before, if bend numbers are used, then, unless the same bend number is used as for the third side, the fourth side must be configured into an appropriate portion of the shadow stack corresponding to the bend, as described before.

When the operator requires to bend a further box of the same type, the process will be faster due to the systems ability to recognise the images matching the shadow maps stored during bending the first box. On bending each side, the system will recognise the image as being one of the stored shadow maps and therefore progress through to state 4 approaching the material rapidly. A single release and reassertion in the case of each side would allow the bend to be completed. Preferably, the maximum height for the tool is appropriately set and confirmation time outs are used, then as per condition 15, the control means confirms safety allowing the approach switch to be asserted once and remain asserted when bending all sides of subsequent boxes. In order to ensure safety, the operator may be trained to hold the material a certain way, and the control system may use all of the above techniques, for instance, vibration reduction, material position sensing or back gauge clamps, alignment correction and speckle reduction to ensure the material is accurately aligned.

Figure 13:
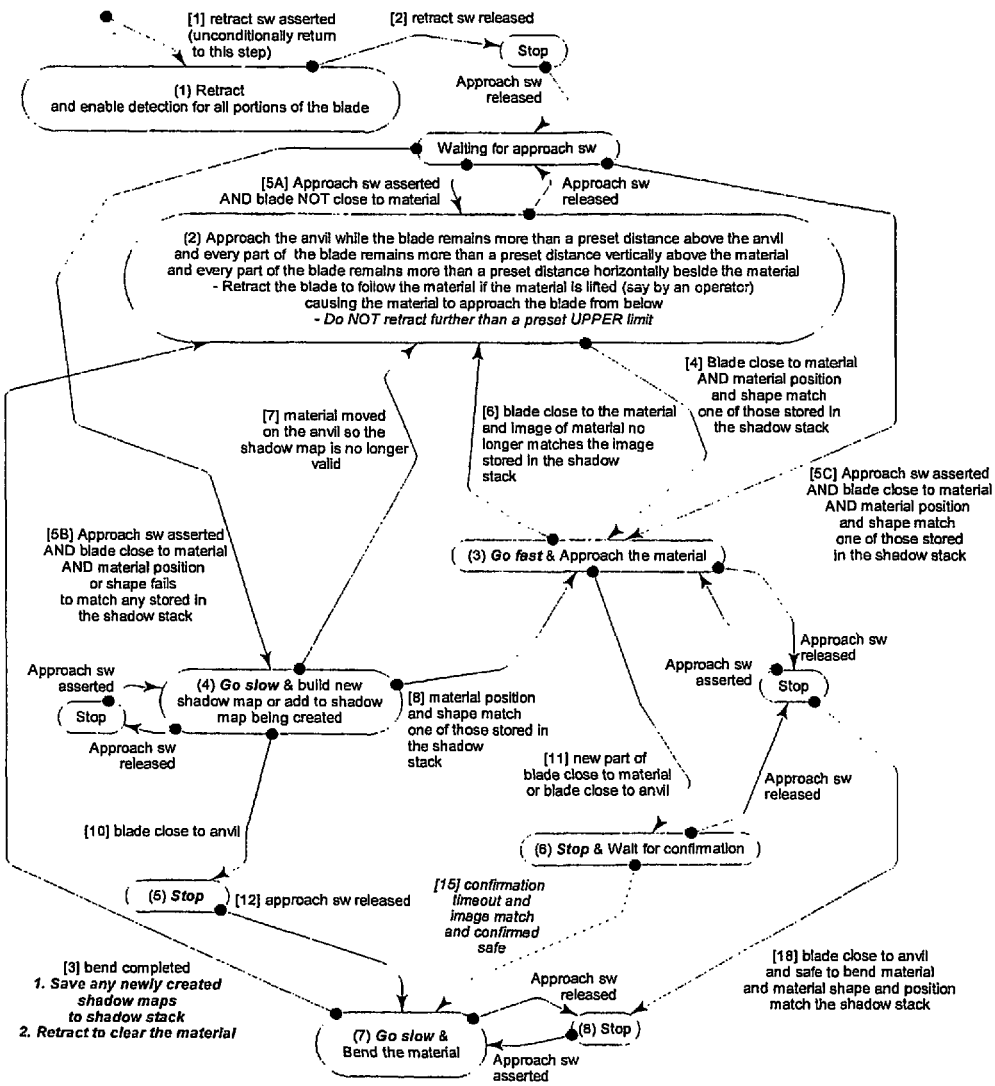
FIG. 13 is a flow diagram of the steps of movement of the tool of the press brake of a control system in accordance with a second alternative embodiment of the present invention.
Figure 14:
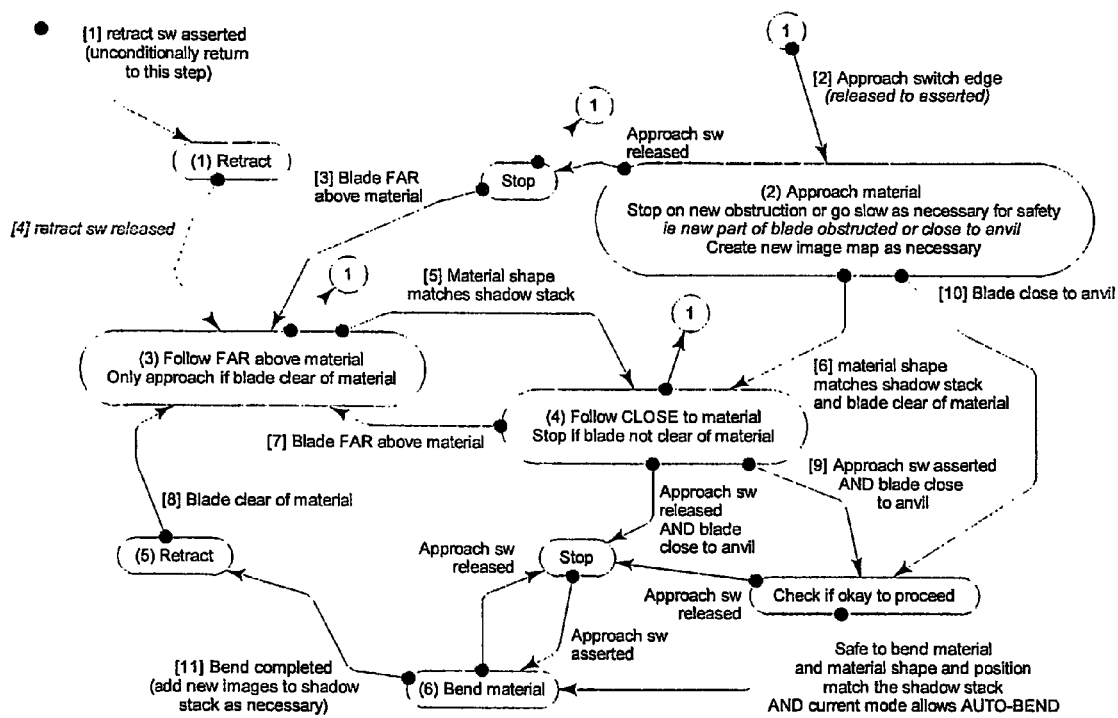
FIG. 14 is a flow diagram of the steps of movement of the tool of the press brake of a control system in accordance with a third alternative embodiment of the present invention.
Figure 15:
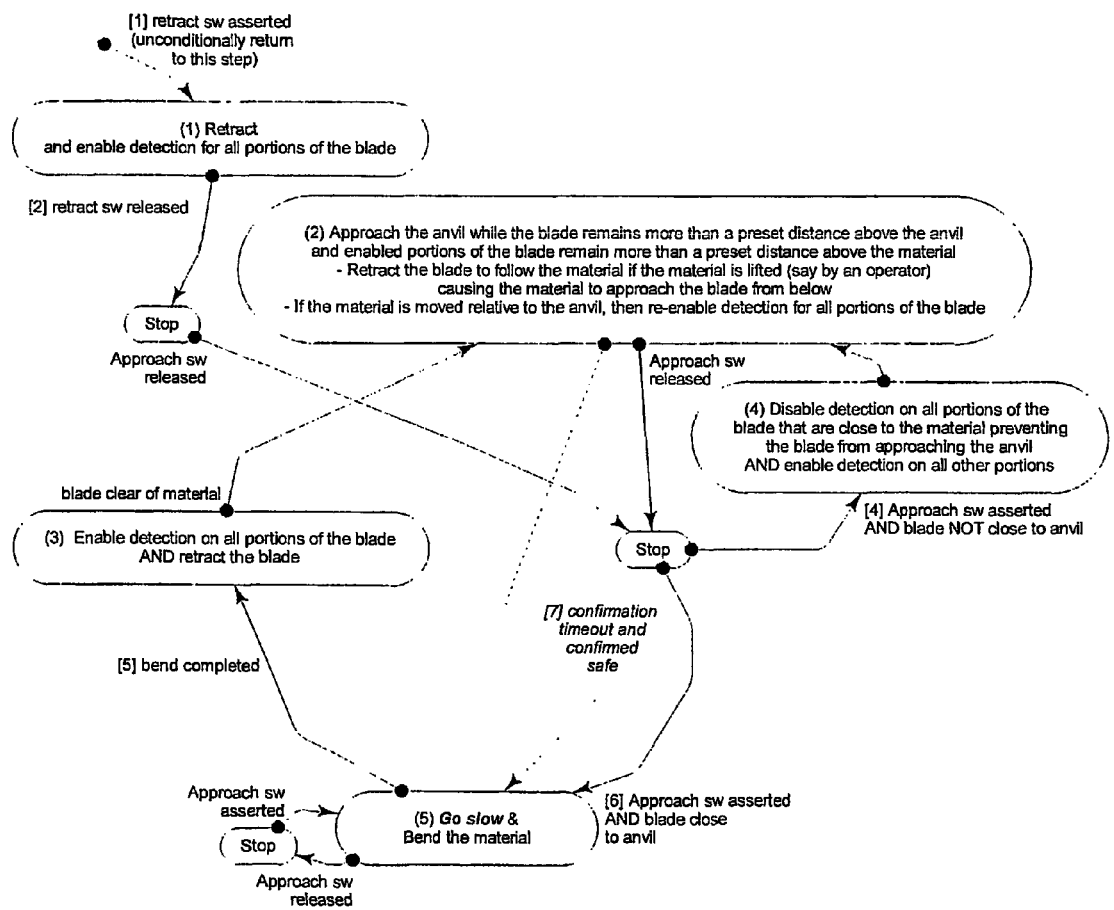
FIG. 15 is a flow diagram of the steps of movement of the tool of the press brake of a control system in accordance with a fourth alternative embodiment of the present invention.

FIGS. 13 to 15 show three further embodiments of logical processes of a system in accordance with the present invention. These embodiments are variation of the system described in to FIG. 12 and can be understood with reference to that embodiment.

The embodiment shown in FIG. 13 is very similar to the embodiment shown in FIG. 12. The main difference is that after the following process (state 2) when the tool has stopped ("waiting for approach sw," state), asserting the approach switch, in the case that the shadow map is not known and the tool is close to the material, results in the tool slowly descending until it is close to the anvil, rather than stopping on each obstruction (that is returning via condition 11 in FIG. 12). The tool is permitted to travel fast if safety can be assured.

FIG. 14 shows an alternative embodiment in which the tool is arranged to follow movement of the obstructions without the approach switch being asserted. The system is arranged such that the tool follows the obstructions at a first relatively long distance if the shadow map is unknown (state 3) and descends to a relatively close distance (state 4) if the shadow map is known. If in state 4, the approach switch is asserted and the tool is close to the anvil, the system will allow the bend to proceed (via condition 9 to "check if ok to proceed" and to state 6). If at any other time the approach switch is asserted, the system will move to state 2, in which the tool will approach the material, going slowly as necessary to ensure safety and stopping at new obstructions and saving new shadow maps until the tool is close to the anvil and the bend may proceed.

FIG. 15 is an alternative embodiment that uses a follow mode (state 2) but which does not use saved shadow maps. In this embodiment, the tool is maintained a preset distance above the obstructions. The tool will stop at this distance when no movement of the obstructions occurs and be in state 2. From this state, if the approach switch is released and reasserted, the tool will either approach and bend the material if the tool is close to the anvil (that is move to state 5) or portions of the tool close to the image will be disabled (state 4) and the system will return to state 2 (that is following the obstructions).

Figure 10:
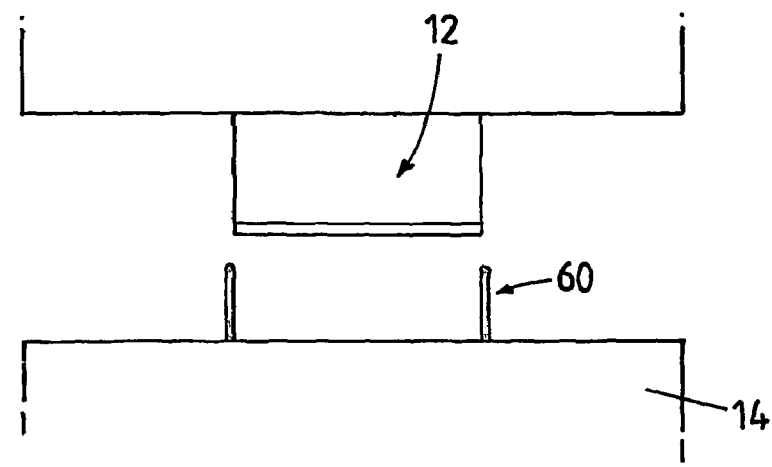
FIG. 10 is a front view of a press brake during the third bend as shown in FIG. 9.
Figure 11:
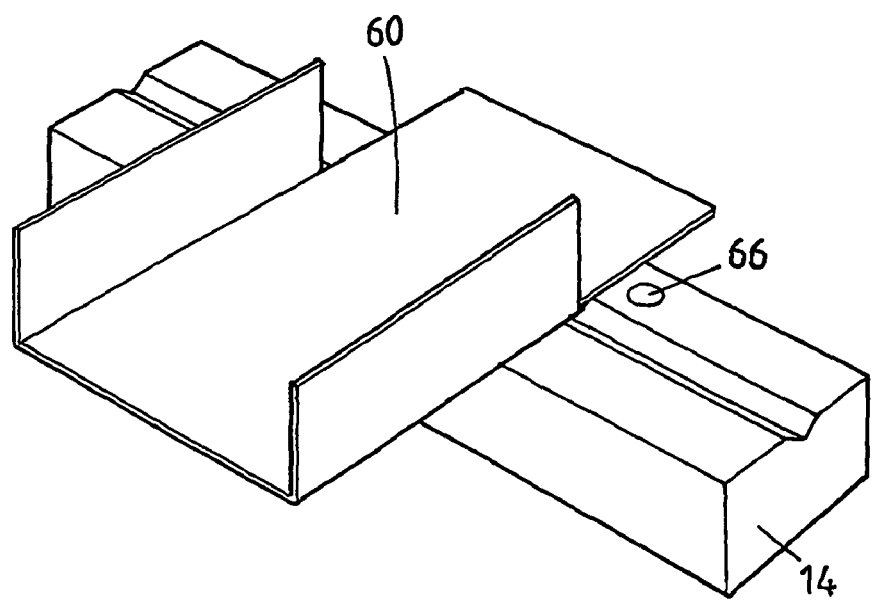
FIG. 11 is a perspective view of a press brake having a control system including a position detection means.

FIGS. 1, 10 and 11 show a further aspect of the present invention. As described previously, a problem arises when bending a side of a box between two upstands, as shown in FIG. 10. The preferred embodiment includes a mode where the blade is able to travel through an upstand without requiring operator confirmation (condition 13 on FIG. 12 only stops on a new part of the tool close to the material if the correct material positioning cannot be confirmed or safety cannot be assured), however if the work is not aligned correctly along the length of the anvil 14, it is possible that the tool 12 may strike one of the upstands. In accordance with this further aspect of the invention, a position sensing means 66 is provided on the press brake. The position sensing means 66 is located relative to the back-gauge clamps 15 or alternatively a required material alignment point such that the position sensing means can determine if the work is correctly positioned laterally on the anvil.

The position sensing means may comprise one or more inductive sensors which can determine whether the work is covering some or all of the sensing means. The output of the sensing means is then used to determine whether the work is correctly positioned prior to the bend.

Alternatively, as described earlier, back gauge clamps (or back gauge slots into which the material is slotted) may be used. In this situation, if the material is not correctly fitted into the back gauge guide slot then the images do not accurately match and so misalignment is detected.

Modifications and variations as would be apparent to a skilled addressee are deemed to be within the scope of the present invention.

For example, as described in WO03/1047111, this system can also be arranged so the light emitting means and receiving means may be mounted stationary relative to either the tool or the anvil.

I claim:

1. A control system for use with a machine having a tool arranged to move through a known path of movement, the control system characterised by comprising:
   a light emitting means arranged to illuminate a region around the path;
   a light receiving means arranged to receive light that has passed through the region such that objects in the region cast shadows on the light receiving means; and
   a processing and control means in communication with the light receiving means such that the processing and control means recognises the presence of the objects in the region by images received by the light receiving means, the processing and control means being arranged to determine the distance between the objects in or adjacent the path of the tool and a leading edge of the tool, the known path extending to a stationary member;
   wherein the control system includes a first mode of operation in which the processing and control means controls movement of the tool such that the distance between the objects in or adjacent the path of the tool and the leading edge of the tool is maintained within minimum and maximum values.

2. A control system in accordance with claim 1 characterised in that the processing and control means includes a memory means, the memory means being arranged to store images received by the light receiving means as known images.

3. A control system in accordance with claim 2 characterised in that the processing and control means stores known images from an external source.

4. A control system in accordance with claim 2 characterised in that the known images are assigned to portions of the memory means corresponding to a particular known machine operation.

5. A control system in accordance with claim 2, wherein the machine is a press brake having an anvil as the stationary member and the tool is arranged to strike material placed on the anvil to bend the material.

6. A control system in accordance with claim 5 characterised in that the maximum value is selected such that the tool and the anvil remain in the field of view of the light receiving means and the minimum value is chosen to be a large enough value such that material can be easily placed onto or removed from the anvil.

7. A control system in accordance with claim 5, characterised in that the maximum and minimum values are varied dependent on how closely the image received by the light receiving means matches a known image stored in the memory means.

8. A control system in accordance with claim 5 characterised in that the control system remains in the first mode of operation while the image received by the processing and control means does not match one of the known images.

9. A control system in accordance with claim 8, characterised in that an approach switch is provided and the control system only remains in the first mode of operation while the approach switch is activated by an operator.

10. A control system in accordance with claim 5 characterised in that a second mode of operation is provided, wherein when the control system is in a second mode of operation, the tool is moved toward the material to a distance closer than said minimum distance.

11. A control system in accordance with claim 10, characterised in that, in the second mode of operation, the tool is moved to a distance from the material such that an operator cannot insert fingers between the tool and the material.

12. A control system in accordance with claim 10, characterised in that the control system moves from the first mode of operation to the second mode of operation when the processing and control means recognised that a portion of the image received by the light receiving means, said portion being the shape and orientation of the material on the anvil, match with a corresponding portion of one of the known images.

13. A control system in accordance with claim 10 characterised in that the control system moves from the first mode of operation to the second mode of operation when the processing and control means recognises the image received by the light receiving means as being one of said known images.

14. A control system in accordance with claim 9, characterised in that the control system only remains in the second mode of operation while the approach switch is activated by an operator.

15. A control system in accordance with claim 8, characterised in that the control system moves from the first mode of operation to the second mode of operation on release and reassertion of the approach switch by the operator and images received by the processing and control means are used to create a known image while the tool moves toward the anvil in the second mode of operation.

16. A control system in accordance with claim 5, characterised in that a third mode of operation is provided, wherein when the control system is in the third mode of operation, the tool is moved to bend the material on the anvil.

17. A control system in accordance with claim 16, characterised in that the known image created in the second mode of operation is saved to the memory means as a known image after the bend is commenced.

18. A control system in accordance with claim 16 characterised in that the control system moves from the second mode of operation to the third mode of operation upon release and reassertion of the approach switch.

19. A control system in accordance with claim 5, characterised in that a fourth mode of operation is provided, wherein when the control system is in the fourth mode of operation, the tool is unconditionally retracted away from the anvil.

20. A control system in accordance with claim 19 characterised in that the control system is provided with a retract switch and the control system moves to the fourth mode of operation when an operator activates the retract switch.

21. A control system in accordance with claim 2, characterised in that when the control system is in the first mode of operation, the processing and control means defines within the images received by the light receiving means:
a retract zone, being around the tool, such that if the nearest objects to the tool are detected in the retract zone, the tool is moved away from the objects;
a stop zone, being around the retract zone, such that if the nearest objects to the tool are detected in the stop zone, the tool movement is stopped; and
a first approach zone, being around the stop zone, such that if the nearest objects to the tool are detected in the first approach zone, the tool is moved toward the objects.

22. A control system in accordance with claim 21, characterised in that the processing and control means defines a second approach zone, being around the first approach zone, such that if the nearest objects to the tool are detected in the second approach zone, the tool is moved toward the objects at a speed relatively faster than movement of the tool occurring when the nearest objects to the tool are in the first approach zone.

23. A control system in accordance with claim 2, characterised in that the tool speed is varied based on the distance between the tool and the boundary of the area defined between said minimum and maximum values to provide smooth movement of the tool.

24. A control system in accordance with claim 1 characterised in that the light emitting means includes a laser diode and the current through the laser diode is modulated to create varying speckle patterns and thereby improve resolution of the received image.

25. A control system in accordance with claim 24, characterised in that the light receiving means includes a screen on which the light passing through the region is incident, the screen being textured to further reduce the effect of speckle patterns produced by the laser diode.

26. A control system in accordance with claim 1, characterised in that the light emitting means includes an adjustment means comprising a plurality of linear actuators, the linear actuators being connected to the light emitting means and arranged to move in a direction parallel to the axis of the emitted light such that linear movement of any one of the linear actuators changes the direction of the emitted light and movement of all of the linear actuators moves the light emitting means optically closer to or further from the light receiving means.

27. A control system in accordance with claim 1, characterised in that the processing and control means comprises a software program residing on a digital signal processor.

28. A control system in accordance with claim 1, wherein the minimum value is set to zero such that the tool approaches the objects when the distance between the objects in or adjacent the path of the tool and the leading edge of the tool is greater than the maximum value but does not retract away from the objects.

29. A method of controlling a machine having a tool arranged to move through a known path of movement, the known path extending to a stationary member, the method comprising:
illuminating a region around the path;
receiving light that has passed through the region;
recognising the presence of objects in the region by shadows cast by said objects;
determining the distance between the objects in or adjacent the path of the tool and a leading edge of the tool; and
controlling movement of the tool in a first mode of operation such that the distance between the objects in or adjacent the path of the tool and the leading edge of the tool is maintained within minimum and maximum values.

30. A method in accordance with claim 29 further including storing images of the received light in a memory.

31. A method in accordance with claim 30 further including assigning the stored images to portions of the memory corresponding to particular known machine operations.

32. A method in accordance with claim 31 wherein the machine is a press brake having an anvil as the stationary member and the tool is arranged to strike material placed on the anvil and further including:
selecting the maximum value such that the tool and the anvil remain in the field of view of the illuminated region; and
selecting the minimum value to be a large enough value such that material can be easily placed onto or removed from the anvil.

33. A method in accordance with claim 32 further including varying the maximum and minimum values dependent on how closely the received images match a known images stored in the memory.

34. A method in accordance with claim 32 further including controlling the movement of the tool in said first mode of operation while the received images do not match a known image.

35. A method in accordance with claim 32 further including controlling the movement of the tool in said first mode of operation while an approach switch is activated by an operator.

36. A method in accordance with claim 32 further including controlling movement of the tool in a second mode of operation in which the tool is moved to a distance closer than said minimum.

37. A method in accordance with claim 36 further including moving the tool to a distance from the material such that an operator cannot insert fingers between the tool and the material in said second mode of operation.

38. A method in accordance with claim 36 further including:

recognising that a portion of the received image, the portion being the shape and orientation of the material on the anvil, matches a corresponding portion of a known image; and moving from the first mode of operation to the second mode of operation.

39. A method in accordance with claim 36 further including:

recognising the received image as a known image; and moving from the first mode of operation to the second mode of operation.

40. A method in accordance with claim 36 further including controlling the movement of the tool in said second mode of operation while an approach switch is activated by an operator.

41. A method in accordance with claim 36 further including:

recognising release and reassertion of the approach switch by the operator;

moving from the first mode of operation to the second mode of operation; and creating a known image from the received images while the tool moves toward the anvil in the second mode of operation.

42. A method in accordance with claim 32 further including operating in a third mode of operation in which the tool is moved to bend the material on the anvil.

43. A method in accordance with claim 42 further including saving the known image created in the second mode of operation to the memory means as a known image after the bend is commenced.

44. A method in accordance with claim 42 further including moving from the second mode of operation to the third mode of operation upon release and reassertion of the approach switch.

45. A method in accordance with claim 32 further including operating in a fourth mode of operation in which the tool is unconditionally retracted away from the anvil.

46. A method in accordance with claim 45 further including moving to the fourth mode of operation when an operator activates a retract switch.

47. A method in accordance with claim 29 further including:

defining within the received images a retract zone around the tool such that if the nearest objects to the tool are detected in the retract zone, the tool is moved away from the objects;

defining within the received images a stop zone around the retract zone such that if the nearest objects to the tool are detected in the stop zone the tool movement is stopped; and defining within the received images a first approach zone around the stop zone such that if the nearest objects to the tool are detected in the first approach zone, the tool is moved toward the object.

48. A method in accordance with claim 47 further including defining a second approach zone around the first approach zone, such that if the nearest objects to the tool are detected in the second approach zone the tool is moved toward the objects at a speed relatively faster than movement of the tool occurring when the nearest objects to the tool are in the first approach zone.

49. A method in accordance with claim 48 further including varying the tool speed based on the distance between the tool and the boundary of the area defined between said minimum and maximum values to provide smooth movement of the tool.

50. A method in accordance with claim 29 further including illuminating the region with a laser diode and modulating current through the laser diode to create varying speckle patterns to improve resolution of the received images.

51. A method in accordance with claim 50 further including providing a screen on which the light passing through the region is incident, the screen being textured to further reduce the effect of speckle patterns produced by the laser diode.

52. A method of controlling a machine having a tool arranged to move through a known path of movement, the method comprising:

illuminating a region around the path;

receiving light that has passed through the region;

recognising the presence of objects in the region by shadows cast by said objects;

determining the distance between the objects in or adjacent the path of the tool and a leading edge of the tool; and controlling movement of the tool in a first mode of operation such that the distance between the objects in or adjacent the path of the tool and the leading edge of the tool is maintained within minimum and maximum values, wherein the maximum value is less than the maximum distance travelled by the tool through said known path of movement, the movement comprising retraction to maintain at least said minimum value.

53. A method of controlling a machine having a tool arranged to move through a known path of movement, the method comprising:

illuminating a region around the path;

receiving light that has passed through the region;

recognising the presence of objects in the region by shadows cast by said objects;

determining the distance between the objects in or adjacent the path of the tool and a leading edge of the tool; and controlling movement of the tool in a first mode of operation such that the distance between the objects in or adjacent the path of the tool and the leading edge of the tool is maintained within minimum and maximum values, said minimum and maximum values being non-zero and non-equal, the movement comprising retraction to maintain at least said minimum value.

54. A method of controlling a machine having a tool arranged to move through a known path of movement, the method comprising:

illuminating a region around the path;

receiving light that has passed through the region;

recognising the presence of objects in the region by shadows cast by said objects;

determining the distance between the objects in or adjacent the path of the tool and a leading edge of the tool; and controlling movement of the tool in a first mode of operation such that the distance between the objects in or adjacent the path of the tool and the leading edge of the tool is maintained within minimum and maximum values, wherein said controlling movement comprises retracting the tool to less than a fully retracted height.

55. The method of claim 54 further comprising controlling movement in additional modes of operation including:

a second mode in which the tool approaches a material being worked upon; and a third mode of operation in which the tool bends the material.

56. The control system of claim 1 wherein the movement includes retraction to maintain at least the minimum value.

57. The method of claim 29 wherein the movement includes retraction to maintain at least the minimum value.

58. The method of claim 29 wherein the machine works on a workpiece and the objects are not said workpiece.

59. A method of controlling a machine having a tool arranged to move through a known path of movement, the method comprising:
- illuminating a region around the path;
- receiving light that has passed through the region;
- recognising the presence of objects in the region by shadows cast by said objects;
- detecting the locations and extents of the objects;
- determining the distance between the objects and a leading edge of the tool; and
- controlling movement of the tool in a first mode of operation such that the distance between the objects in or adjacent the path of the tool and the leading edge of the tool is maintained within minimum and maximum values, wherein the minimum and maximum values are altered in response to the detected extents of the objects.

* * * * *